(12) United States Patent
Valley et al.

(10) Patent No.: US 6,515,249 B1
(45) Date of Patent: Feb. 4, 2003

(54) METHOD OF RAILROAD RAIL REPAIR

(75) Inventors: Greg A. Valley, Lexington, SC (US); Mark Edward Rovnyak, Mokena, IL (US)

(73) Assignees: Harsco Technologies Corporation, Fairmount, MN (US); Holland Company LP, Crete, IL (US)

( * ) Notice: Subject to any disclaimer, the term of this patent is extended or adjusted under 35 U.S.C. 154(b) by 0 days.

(21) Appl. No.: 09/675,350

(22) Filed: Sep. 29, 2000

(51) Int. Cl.⁷ .............................................. B23K 11/04
(52) U.S. Cl. ........................ 219/55; 104/15; 228/112.1
(58) Field of Search ............................. 219/55, 53, 54; 104/2, 15; 228/112.1

(56) References Cited

U.S. PATENT DOCUMENTS

| | | | |
|---|---|---|---|
| 981,695 A | * | 1/1911 | Schultz ........................ 219/55 |
| 3,623,207 A | * | 11/1971 | Zoso et al. .................... 104/15 |
| 4,232,610 A | | 11/1980 | Theurer |
| 4,270,036 A | | 5/1981 | Zollinger |
| 4,320,708 A | | 3/1982 | Bommart |
| 4,983,801 A | | 1/1991 | Theurer et al. |
| 5,136,140 A | | 8/1992 | Theurer et al. |
| 5,237,143 A | * | 8/1993 | Scheuchzer .................. 104/15 |
| 5,270,514 A | | 12/1993 | Wechselberger et al. |
| 5,389,760 A | | 2/1995 | Zollinger |
| 5,992,329 A | | 11/1999 | Scheuchzer et al. |

* cited by examiner

Primary Examiner—Clifford C. Shaw
(74) Attorney, Agent, or Firm—David C. Jenkins; Eckert Seamans Cherin & Mellott, LLC

(57) ABSTRACT

A method of repairing a damaged railroad rail comprising the steps of: identifying a defect in the rail, removing the portion of the rail having a defect and leaving two truncated rail ends, preparing the truncated rail ends for welding, and welding the two truncated rail ends together.

19 Claims, 1 Drawing Sheet

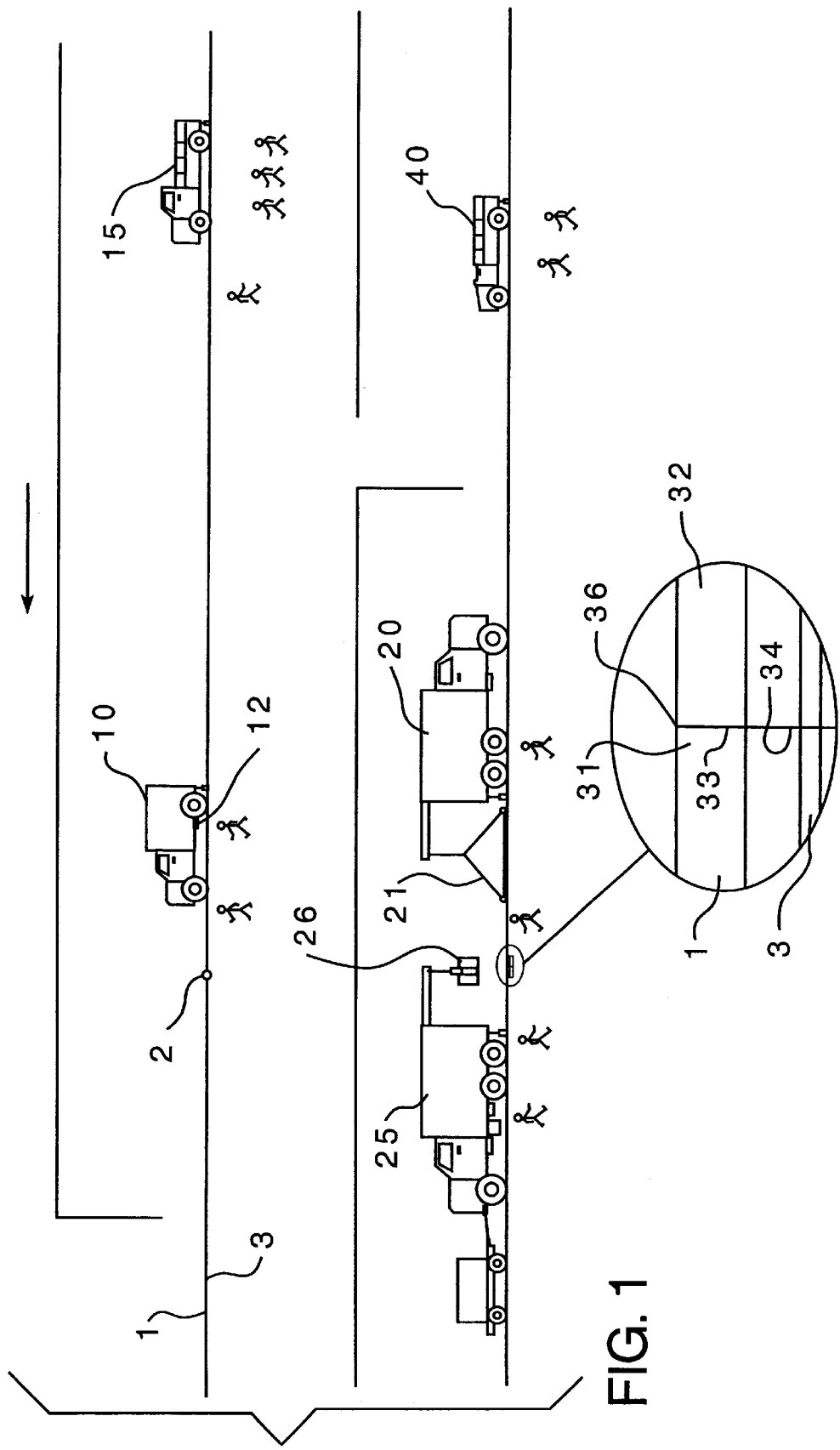

METHOD OF RAILROAD RAIL REPAIR

BACKGROUND OF THE INVENTION

1. Field of the Invention

This invention relates to a method of repairing a railroad rail which includes a defect, and more specifically, to a method of repairing a railroad rail having a defect which includes the step of removing the portion of the rail with the defect and welding the remaining rail ends together.

2. Background Information

Railroad rails may be manufactured with internal defects or, as a result of wear-and-tear, develop defects. Such defects include, but are not limited to, inclusions, pits, rust, welds, batter, and engine burns. Such defects need to be repaired in order to safely operate the railroad.

There are two common methods of railroad repair: thermite welds and flash-butt welding. Rails repaired by flash-butt welding are typically stronger and higher in quality than those repaired by a thermite weld. Additionally, rails may be temporarily repaired through the use of Joint Bar splices.

When repairing a rail with a thermite weld, a portion of the rail localized around the defect is removed. The thermite material is then poured in a mould. As the thermite material cures, it forms a plug which bonds to, and is contiguous with, the rail being repaired. The area of the rail having the thermite weld material is not as strong and is not of the same quality as a normal rail. As such, the thermite weld may require successive repairs in order to maintain the railroad rail in a safe condition. This method also requires the repair crew to transport the repair materials to the repair site.

Flash-butt welding is accomplished by bringing two ends of rail segments together and passing a current through the interface. As the current passes through the interface the rail becomes heated and malleable to the point where the two rail ends are forged together to provide a weld. When repairing railroad rail using flash-butt welding, a portion of the rail, typically five feet to nineteen feet, on both sides of the defect is removed. A new rail segment is then placed in the gap left by the removed rail. The two ends of the replacement segment are then flash-butt welded to the original rail. The rail segment is then shaped to match the existing rail. This repair method results in the removal of a considerable length of rail and requires two flash-butt welds in order to complete the repair. This process is time consuming and requires the repair crew to transport repair materials is addition to the repair equipment.

Joint Bar splices are, essentially, a reinforcing clamp applied to the rail adjacent to the repair. A Joint Bar splice is used when there is not enough time to perform a complete repair or when other repair materials are not available. A Joint Bar splice, by government regulation, is a temporary repair and must be replaced in about 90 days. The Joint Bar splice reduces the operational limit of the rail in the repair area.

Regardless of the repair method used, there is a need to track the Neutral Rail Temperature ("NRT"). The NRT is based on the temperature of the rail when the rail is installed. The rails are structured to contract and expand in response to environmental temperature changes. The amount of expansion and contraction is determined by the NRT. When a repair is made, the NRT of the rail is altered. For example, use of a thermite repair changes the material that comprises the rail. These different materials have different coefficients of thermal expansion. When a repair is accomplished using a flash-butt welding to insert a rail segment, the segment may, or may not, be made of the same material as the rail, however, it is unlikely that the segment will be installed at exactly the same temperature as the rail. As such, the segment will have a different NRT than the rail, thus, the NRT of the entire rail is changed. Management of the NRT could be simplified if only the original rail material was used and only a small portion of the rail was removed.

There is, therefore, a need for a rail repair method which results in a rail having the strength and quality of a flash-butt-welded rail, but without the wasted material.

There is a further need for a rail repair method which may be accomplished with existing equipment.

There is a further need for a rail repair method which reduces the number of flash-butt welds on the remaining rail.

There is a further need for a rail repair method which reduces the amount of materials and equipment that must be transported to the repair site.

There is a further need for a rail repair method which does not require the rail to be reshaped in order to complete the repair.

There is a further need for a rail repair method which may be completed in less time than prior art repair methods.

There is a further need to eliminate the use of temporary Joint Bar splices.

There is a further need to simplify the management of the NRT.

SUMMARY OF THE INVENTION

These needs, and others, are satisfied by the disclosed method which provides for repairing a rail having a defect using a single weld.

The repair method begins when a rail defect is identified by using an ultrasonic rail-testing car. The ultrasonic rail-testing car can precisely locate and mark the area of the rail containing the defect. Additionally, manual testing of the defect may further delineate the areas of the rail which contain the defect. The defect is then consumed by a welding procedure.

To accomplish the repair, the railroad rail having the defect, and extending a predetermined length on either side of the defect, is removed. The removed rail portion is to be minimized to maintain the Neutral Rail Temperature (NRT). Once the defect has been removed, the truncated ends of the railroad rail may be shaped to correspond to each other which will result in a stronger weld. Preferably, both truncated ends have a surface that is generally perpendicular to the rail. Flash-butt welding is, preferably, used to heat the rail ends. The truncated rail ends are drawn together and a current is passed through the interface. As the current passes through the interface between the truncated rail ends, the rail is heated, becomes malleable, and is welded together. Alternate means of heating the rail ends, such as friction welding, may also be used.

Because the repair is accomplished using only original rail material, there is no need to transport repair materials to the repair site. Additionally, the NRT of the original rail is maintained as no additional materials are being added to the rail. Because only a single weld needs to be made, the repair procedure is faster than prior repair procedures. Given that the repair method is faster and does not require additional materials, this method of repair can be performed instead of using a Joint Bar splice.

It is an object of this invention to provide a method of repairing a rail which results in a rail having the strength of a welded rail but without the necessity of inserting a rail segment and having two welds.

It is a further object of this invention to provide a method of repairing a rail which does not result in excessive wasted rail material.

It is a further object of this invention to provide a method of repairing a rail which will not require the rail repair crew to carry large amounts of rail in order to accomplish a repair.

BRIEF DESCRIPTION OF THE DRAWINGS

A full understanding of the invention can be gained from the following description of the preferred embodiments when read in conjunction with the accompanying drawings in which:

FIG. 1 is a schematic drawing showing the steps of the rail repair method.

FIG. 1A is a detail of the truncated rail ends.

DETAILED DESCRIPTION OF THE PREFERRED EMBODIMENT

As shown in FIG. 1, a railroad rail 1 having a defect 2 may be repaired using a single flash-butt weld. Initially, a defect in the railroad rail is located by an rail-testing means, preferably an ultrasonic rail testing vehicle 10 which travels along the railroad rail. The rail defect, however, may be located by other means such as an induction means, dye penetration means or other known methods of defect identification. When the ultrasonic rail testing vehicle 10 identifies a defect, it will mark the defect location. The defect location may be recorded on a map, or a nozzle 12 may mark the rail, for example with paint. Alternatively, the location of the defect may be recorded using information gathered from such sources as the global positioning system of the network of satellites. After the defect location has been identified, a repair crew will be dispatched to the defect location. The repair crew will travel with a cutting vehicle 15, a puller vehicle 20 and welding vehicle 25. The welding vehicle is preferably a flash-butt welding vehicle that is known in the prior art, such as the Model-In track EFB Mobile Welder, manufactured by Holland Company LP, 1000 Holland Drive, Crete, Ill. 60417. When the repair crew arrives at the defect location it may perform further tests to delineate the exact size of the rail defect.

If the rail defect is small enough to be consumed by the welding process, generally between $1/16^{th}$ to 3 inches in length, the defect may be repaired using the single welding technique. A portion of the rail 1 which includes the defect area, as well as a predetermined length of rail on both sides of the defect are removed. The width of the removed portion is generally about 0.25 inch, the width of the cutting means blade. The width of the removed portion may, however, be as large as about 5 inches. Preferably, removal of the rail is accomplished by a cutting means such as, but not limited to, an abrasive rail saw, cutting torch, or reciprocating saw transported by the cutting vehicle 15. The cutting means is used to cut through the defect area. If the defect cannot be removed by a single cut, the defect may be cut out by cutting the rail 1 on either side of the defect.

After the defect containing portion of the rail 1 is removed, the rail is left with two truncated ends 31, 32. The truncated rail ends 31, 32 may not have surfaces that would fit together. That is one truncated end 31 may be rough and/or slanted while the other truncated rail end 32 is smooth and/or generally vertical. However, the truncated ends 31, 32 are cut, the truncated ends 31, 32 may be shaped to have generally corresponding profiles. Preferably, both truncated ends 31, 32 are shaped to have a face 33, 34 that is generally vertical surface that extends generally ninety degrees to the longitudinal axis of the rail 1.

The rail fasteners, such as spikes, anchors, and clips are then removed and a rail puller vehicle 20 is placed adjacent to the repair site. The rail puller vehicle includes a puller device 21 capable of pulling the rail ends 31, 32 into contact with each other. Typically, this requires about 70 to 300 tons of force. Next, the welding vehicle 25 is placed adjacent to the repair site. If flash-butt welding is used, the welding vehicle includes a puller-welding head 26. The puller welding head 26 will hold the two truncated ends 31, 32 together so that faces 33, 34 contact each other, creating an interface 36. The puller-welder head 26 applies a force sufficient to compress the truncated ends 31, 32 together. The puller-welder head 26 then passes a current through the interface 36 causing the metal which forms the rail 1 to become malleable and melt. To facilitate the welding process, the current may be applied through the interface in pulses. Alternatively, the truncated ends 31, 32 may be heated by other means such as friction welding. If friction welding is used, the truncated ends 31, 32 are placed in contact with each other and agitated or vibrated until the friction between the truncated ends 31, 32 causes the metal which forms the rail 1 to become malleable and melt. Other welding means, such as robotic welding, may also be used.

As the rail 1 is heated at the interface 36, the truncated ends 31, 32 are forged together to provide the weld. After the welded interface 36 cools, the puller-welder head 26 is removed and railroad rail 1 may be finished ground by a finishing crew 40 to remove any surface defects created by the welding procedure. Finally, the finishing crew 40 installs any anchors, spikes or other such devices to secure the rail 1 to a railroad bed 3.

The method of rail repair shown in FIG. 1 is also useful as a method of managing the Neutral Rail Temperature ("NRT"). When the rail 1 is first installed the environmental conditions are within a selected range. These environmental conditions are recorded and the initial NRT is established. When a portion of rail 1 is replaced by a new material, such as thermite or a rail segment, the NRT must be recalculated and tracked. By virtue of not replacing any portion of the rail 1 with a rail segment installed under different environmental conditions or made of a different material, such as thermite, the initial NRT is maintained.

While specific embodiments of the invention have been described in detail, it will be appreciated by those skilled in the art that various modifications and alternatives to those details could be developed in light of the overall teachings of the disclosure. For example, the puller and the puller-welder vehicle may be combined. Accordingly, the particular arrangement of steps disclosed are meant to be illustrative only and not limiting as to the scope of invention which is to be given the full breadth of the claims appended and any and all equivalents thereof.

What is claimed is:

1. A method of repairing a damaged rail comprising the steps of:
   a. identifying a defect in the rail;
   b. removing the portion of the rail having a defect and leaving two truncated rail ends;
   c. preparing the truncated railroad rail ends for welding;
   d. welding the two truncated rail ends together.

2. The method of claim 1, wherein said welding step utilizes friction welding.

3. The method of claim 1, wherein said welding step utilizes flash-butt welding.

4. The method of claim 3, including the further step of pulling said rail ends together using a puller vehicle.

5. The method of claim 3, wherein said preparation step further includes the step of shaping the truncated rail ends to have corresponding profiles.

6. The method of claim 5, wherein said corresponding rail end profiles are two generally vertical surfaces that extend generally ninety degrees to the longitudinal rail axis.

7. The method of claim 6, wherein said flash-butt welding step includes the step of passing a current between said truncated rail ends until said ends become malleable.

8. The method of claim 6, wherein said current is applied in pulses.

9. The method of claim 6, wherein said flash-butt welding step includes the step of holding said truncated rail ends together under pressure.

10. The method of claim 3, wherein said removing a portion of the rail step includes the step of measuring said defect to ensure said defect is not larger than the length of rail the flash-butt welding step will consume.

11. The method of claim 10, wherein said removing a portion of the rail step includes cutting the rail on either side of said defect.

12. The method of claim 1, wherein said removing a portion of the rail step includes the step of measuring said defect to ensure said defect is not larger than the length of rail the flash-butt welding step will consume.

13. The method of claim 12, wherein said removing a portion of the rail step includes cutting the rail on either side of said defect.

14. The method of claim 1, wherein said identifying the defect step includes using an ultrasonic testing vehicle to identify the location of the defect.

15. The method of claim 1, wherein said identifying the defect step includes using an induction means to identify the location of the defect.

16. The method of claim 1 including the further step of finishing said rail to remove any surface defects.

17. The method of claim 1 including the further step of securing said rail to a railroad bed using anchors, spikes or other fasteners.

18. A method of managing the Neutral Rail Temperature of a rail comprising the steps of:

a. establishing an initial Neutral Rail Temperature;

b. tracking changes in the Neutral Rail Temperature when a portion of the rail is repaired using new material;

c. not tracking changes to the Neutral Rail Temperature when the rail is repaired by a repair method that does not use new material.

19. The method of claim 18, wherein said repair method includes the steps of:

a. identifying a defect in the rail;

b. removing the portion of the rail having a defect and leaving two truncated rail ends;

c. preparing the truncated railroad rail ends for welding;

d. welding the two truncated rail ends together.

* * * * *